United States Patent
Pan

[11] Patent Number: 5,917,738
[45] Date of Patent: Jun. 29, 1999

[54] REMOVING THE GIBBS PHENOMENON IN FOURIER TRANSFORM PROCESSING IN DIGITAL FILTERS OR OTHER SPECTRAL RESOLUTION DEVICES

[76] Inventor: Cheh Pan, 13263 Paramount Dr., Saratoga, Calif. 95070

[21] Appl. No.: 08/965,932

[22] Filed: Nov. 7, 1997

Related U.S. Application Data

[60] Provisional application No. 60/029,722, Nov. 8, 1996.
[51] Int. Cl.⁶ ............................. G06F 15/00; G06F 17/10
[52] U.S. Cl. ................................. 364/726.01; 364/724.18
[58] Field of Search .................. 364/726.01, 724.18, 364/724.011

[56] References Cited

U.S. PATENT DOCUMENTS 5,574,674 11/1996 Pan ..................................... 364/726.01
5,671,168 9/1997 Liu et al. ............................ 364/724.18

*Primary Examiner*—Tan V. Mai
*Attorney, Agent, or Firm*—Robert S. Kelly

[57] ABSTRACT

A process for eliminating the Gibbs phenomenon in a train of digital signals when such signals are undergoing a discrete Fourier transform or a fast Fourier transform without using conventional windowing techniques wherein the train of digital signals is monitored and terminated when the last received or digital signal data point is equal to, or within a predetermined tolerance limit of, the first received digital signals so that the waveform of the train of digital signals reaches a complete periodicity within its length whereby no spurious frequency components will arise due to the Gibbs phenomenon. The process is shown as used in an all-purpose and multi-functioning digital filter.

12 Claims, 2 Drawing Sheets

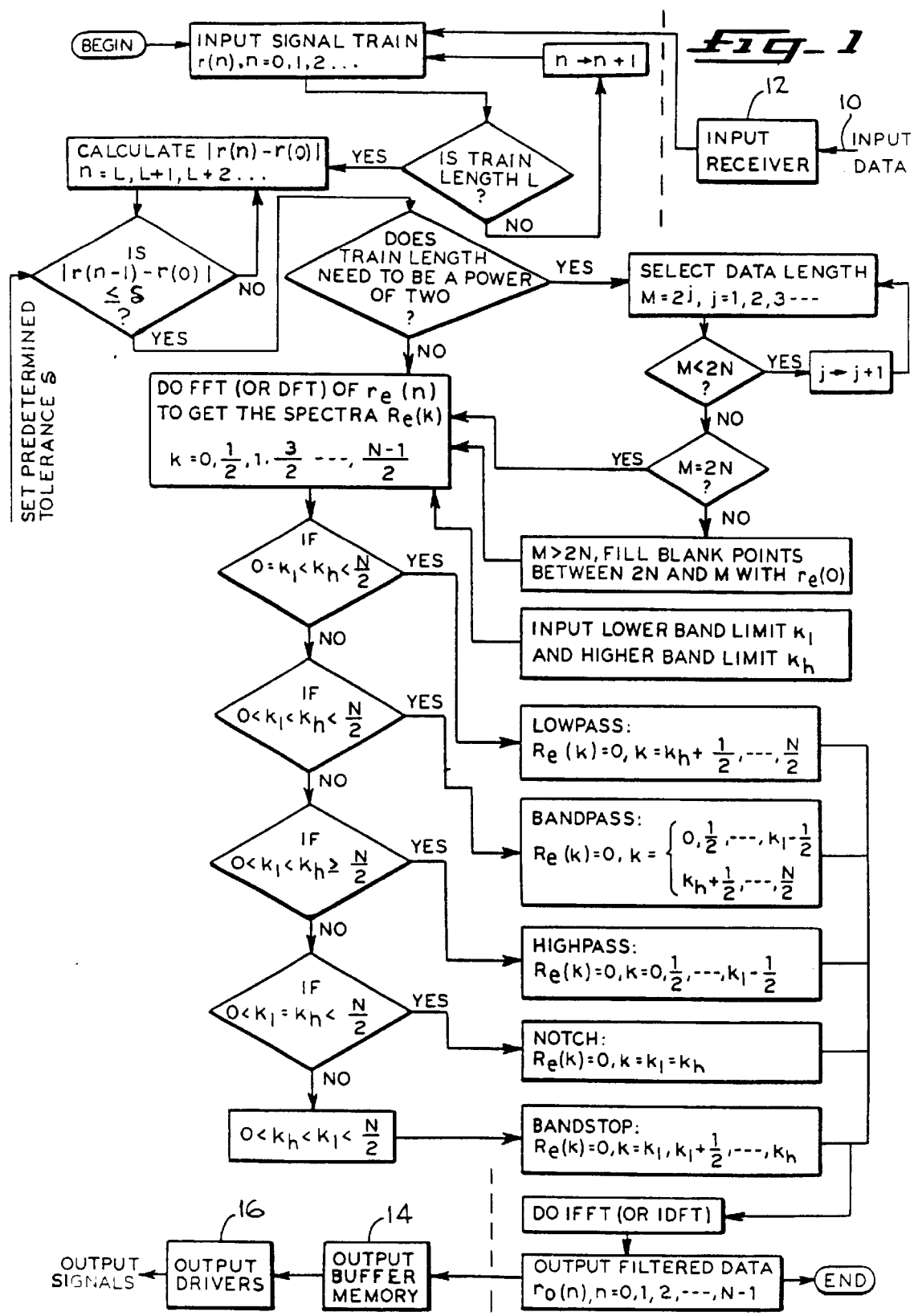

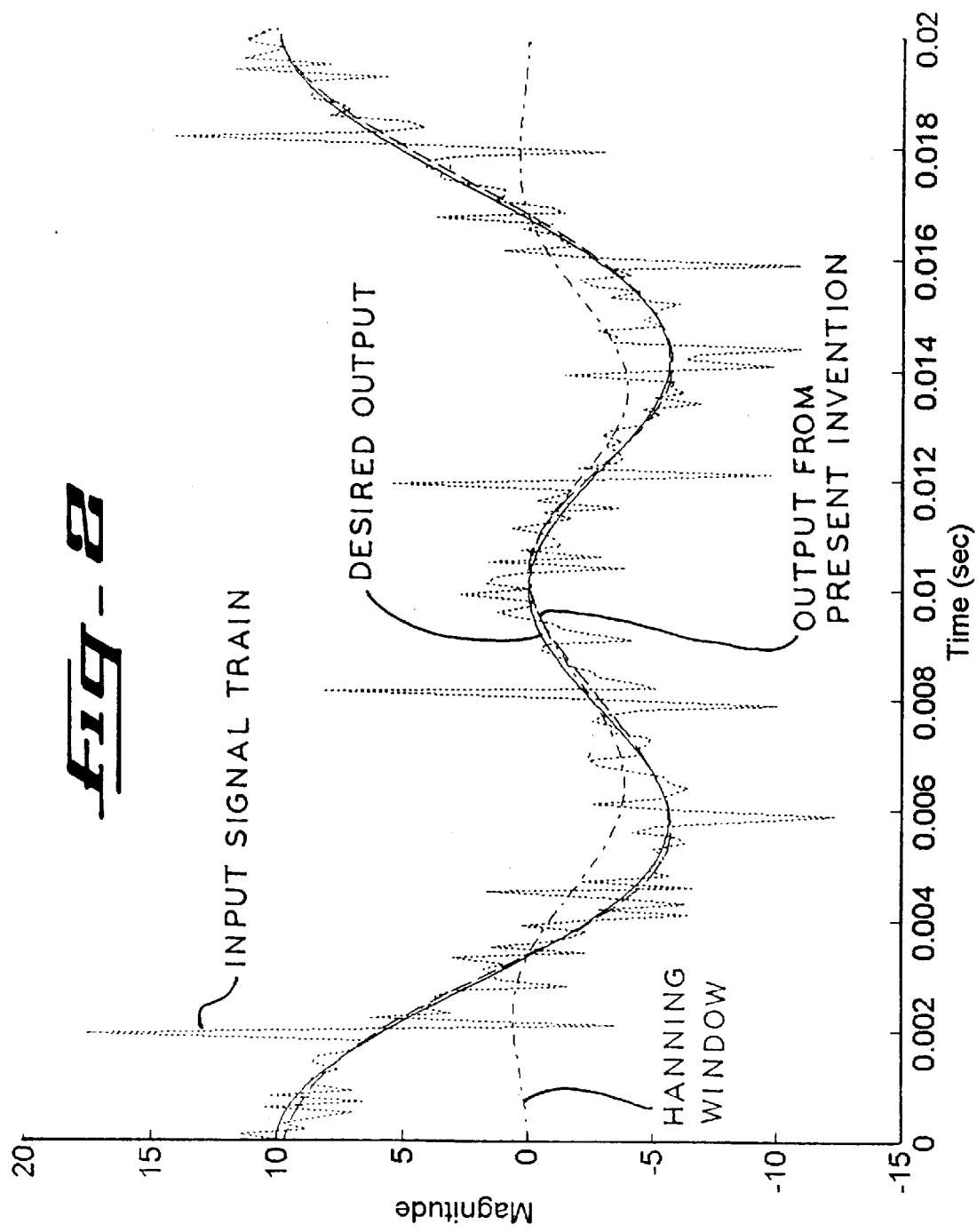

REMOVING THE GIBBS PHENOMENON IN FOURIER TRANSFORM PROCESSING IN DIGITAL FILTERS OR OTHER SPECTRAL RESOLUTION DEVICES

REFERENCE TO PRIOR APPLICATION

This application claims the benefit of U.S. Provisional application Ser. No. 60/029,722, filed Nov. 8, 1996 and entitled METHODS FOR ELIMINATING THE GIBBS PHENOMENON IN FOURIER TRANSFORM PROCESSING FOR DIGITAL FILTERS OR OTHER SPECTRAL RESOLUTION DEVICES.

BACKGROUND OF THE INVENTION

1. Field of the Invention

The present invention pertains to means and methods for removing or eliminating the Gibbs phenomenon from Fourier transforms, and more particularly, it pertains to digital techniques or digital processors, such as digital filters or other spectral resolution devices, which filter a train of digital signals or measure the spectral ratios of two trains of digital signals using the Fourier transform method.

2. Description of the Prior Art

In the design of digital filters or other digital devices requiring spectral resolution (e.g., spectral ratio measuring devices to determine the attenuation coefficient or quality factor from signals), a commonly used technique is the discrete Fourier transform (DFT) or the fast Fourier transform (FFT) wherein a train of digital signals in the time domain is transformed into the frequency domain for a selective elimination (filtering) or ratio measurement (e.g., attenuation coefficient or quality factor Q measuring). A continuing problem with such methods is the well-known Gibbs phenomenon, which appears in a DFT (or FFT) due to the incomplete periodicity of the digital signal train within its length which fails to match with the complete periodicity of the sinusoids in the DFT (or FFT) at the end of the signal train. That is to say, the start and end values in the digital signal train provide discontinuities or a difference between its end points which introduce or leak spurious frequency components into the Fourier transformed signals. The conventional way to treat the Gibbs phenomenon is to apply a window function to the signal train to taper it to zero at the end points. However, the use of windowing will distort the waveform of the signals to be measured or induce end effects, i.e., the introduction of spurious frequency components into the signals.

SUMMARY OF THE INVENTION

With the present invention, a technique for eliminating the Gibbs phenomenon in a DFT (or FFT) is provided without using the conventional windowing method. This novel technique involves comparing each successive digital point of an input signal train defined by a sequence of discrete numerical values with the first point of the train. The comparison terminates when a point in the train is found which is equal to or different from the first point with a very small pre-determined value or tolerance. Such a digital comparison yields a waveform with equal or near-equal end points which will reach a complete periodicity within its length to match with that of the sinusoids in the DFT (or FFT) while the original signals are still kept intact, so that no spurious frequency components arising from the Gibbs phenomenon are introduced.

This waveform of complete periodicity is then transformed into the frequency domain by a conventional Fourier transform method (DFT or FFT) wherein the unwanted spectral bands of the signals can be zeroed out or attenuated while the wanted bands are fully passed or amplified (in filtering), or the selected bands may be used in spectral ratio measurements or the like. The passed or amplified bands, together with the zeroed-out or attenuated bands, can then be inversely transformed back into the time domain to complete the digital filtering process.

In applying this technique to digital filters or similar spectral resolution devices, it has been found that any or all of the filtering operations can be performed in a single sequence with the components represented in the frequency domain. Thus, a digital filter can be provided which is truly universal and provide any type of filtering operation merely by selecting or eliminating different frequency components while they are digitally represented within the frequency domain.

BRIEF DESCRIPTION OF THE DRAWINGS

FIG. 1 is a diagrammatic representation of a digital filter embodying the present invention particularly including a flow chart depicting the general purpose programming for the digital filtering process utilizing the technique of the present invention.

FIG. 2 is a graph depicting a typical digital signal train and its reconstruction utilizing the digital filter of the present invention as contrasted with a conventional technique utilized by the prior art.

DESCRIPTION OF THE PREFERRED EMBODIMENT

An important tool in the implementation of digital filters or other digital processing devices which rely on the selection or measurement of frequency domain spectra is the DFT. Its importance arises from the fact that it can be efficiently computed by using some very powerful algorithms known collectively as the FFT method. However, such discrete Fourier transform methods are plagued by the so-called Gibbs phenomenon, an inherited property of the Fourier transform arising from the truncation of the digital signals received. Thus, the signals actually received in the form of a sequence of digital values will have discontinuities or a difference at its end points, and this will introduce or leak spurious frequency components into the Fourier transformed signals, which is namely the Gibbs phenomenon. As explained previously, the conventional way to treat the Gibbs phenomenon is to taper the digital values in a signal train to zero at the end points by the application of a so-called window function to the signals, typically by multiplying the signal train by a pre-defined function such as a one-half sinusoidal wave like the Hanning window. However, this usually results in a waveform distortion and has not proved to be wholly satisfactory.

It has been discovered by me that the real task of the conventional windows is to force the end points of a signal train to become equal in order for the waveform represented by this sequence of digital values to reach a complete periodicity; i.e., to reach a complete periodic cycle at the end of the sequence to match with the complete periodicity of the sinusoids in the DFT. From this discovery, a better revision of the original digital sequence is possible. For example, if the end values can be made equal or near-equal while retaining the original signals in the sequence intact, a more accurate Fourier transformation of the signals can be achieved. Thus, with the present invention, a scheme is utilized for achieving a digital signal train which have equal or near-equal end points but which do not disturb the original signals and therefore do not distort the waveform of the signals or leak any spurious frequency components into the signals when they are transformed into the frequency domain.

Such a scheme has been dubbed "digital comparison", which scheme eliminates the discontinuities or the difference at the end points of the signal train with no weighting of the remaining digital points, and it thus retains the frequency components of the original signals without waveform distortion. In this scheme each successive digital point of the input signal train is compared with the first point of the train, to see whether they are equal or near-equal to each other. The comparison will terminate when a point is found to be either equal to, or different from the first point with a value which is either less than or equal to a tolerance δ. That is, for an input signal train, r(n), n=0,1,2 . . . , the filter chooses the waveform length N of its input from the comparison, $$|r(N-1)-r(0)| \leq \delta, \qquad (1)$$

where δ is a very small empirically pre-determined value which is close to, but not necessary to be exactly, zero. This method can be very useful for filtering of signal trains in sections of various lengths that often start and end at zero or near zero, such as those in speech and audio processing. However, there can be cases that either more than one or none of the points in the signal train that will satisfy equation (1). We may empirically pre-specify a minimum length to prevent a pre-mature ending of a signal train section, such that the comparison will start only after the minimum length. We may also pre-specify the end points, such that there will be successively more than one point at the end of each section that will satisfy equation (1). For instance, we may make the signal train sections either to end at two or more successive points that are equal to the first point, or to start at zero and end at two or more zeros.

In carrying out the foregoing in a practical application such as a digital filter, either a hardware or a software approach may be taken. FIG. 1 illustrates the software approach wherein a conventional computer or microprocessor is utilized to receive input signals. The filter determines the input length N, and then outputs filtered signals of the same length with either lowpass, bandpass, highpass, notch or bandstop filtering being accomplished according to the input frequency band selection. The input signals 10 are received by an input receiver 12 which is comprised of the conventional accumulator registers and buffers for feeding the signals into the computer or microprocessor. From FIG. 1 it will be seen that the input signal train of length N, r(n), n=0,1,2, . . . N−1, is chosen by the digital comparison method of this invention. Thus, a train length L is determined empirically (depending upon the type of signals to be processed) which is set so that the individual signal monitoring process will not begin until train length L is received. Then the predetermined tolerance level δ is set and the first and last points of the train are compared until a match (within the tolerance level) is found. The tolerance level δ will also be empirically determined so as to remove the effects of noise from the system; thus, level δ may be set at the noise level or, preferably, at a little higher level.

If the FFT input length needs to be a power of two, a loop shown in FIG. 1 determines an appropriate length M that is the next highest length of power of two above the length N. The blank points between the lengths N and M are then filled with the value r(0), the first point in the signal sequence, which reduces the end effects in the filtering. A FFT (or DFT) is then performed on this signal train r(n) to get the spectra R(k), with k=0,1,2, . . . , N+1)/2. For a further and more complete description of the FFT process, reference is herein made to my prior application, Ser. No. 209,251, filed Mar. 14, 1994, now U.S. Pat. No. 5,574,674, issued Nov. 12, 1996, the disclosure of which is specifically incorporated herein by reference.

Finally, as further shown in FIG. 1, the frequency domain spectra R(k) is then subjected to a series of tests to determine which type of filtering is to be performed. This information is input into the system by defining a lower band limit $k_l$ and a higher band limit $k_h$. If $k_l$=0 with $k_h$ greater than $k_l$ and smaller than N/2, a lowpass filter is selected, and R(k) will be provided as shown. If $k_l$ is greater than 0 and less than $k_h$, and $k_h$ is smaller than N/2, a bandpass filter is desired with the resulting spectra R(k) being as indicated. For a highpass filter, $k_h$ will be greater than $k_l$ and also equal to or greater than N/2, the highest frequency obtainable in the Fourier spectra. If $k_l$ equals $k_h$, a notch filter is provided with the spectra R(k) being as shown. Finally, if $k_l$ is input at a value higher than $k_h$, the circuitry will recognize the bandstop filter (as contrasted with the bandpass filtering operation) with the spectra R(k) being as shown. The selected or "filtered" spectra R(k) is then run through an inverse Fourier transform (IFFT or IDFT) in the conventional manner to provide a filtered output, $r_o(n)$, n=0,1,2, . . . ,N−1. This can be output to a conventional buffer memory 14 and the output drivers 16 to transmit the filtered signals to the user.

The capability of this digital filter in doing different filtering operations simply by a manipulation of the frequency band limits make it an all-purpose filter as contrasted with the conventional digital filters which are only single purpose, e.g., a conventional lowpass filter can only be used to pass lower frequency bands, etc. However, the capability or flexibility of the filter does not end here. Since the selection of passband or stopband values is done in the frequency domain, these can be manipulated in many different ways to achieve a wide range of useful results. For instance, the software may be readily modified to allow a combination of different passbands and stopbands through input of multi-pairs of band limits, and the band limits can be designed to be adjusted either automatically or manually. The filter can also be readily modified to permit the amplification or modification of some spectral components or bands while concurrently attenuating other components or bands. The filter can, therefore, accomplish bandpass and bandstop, adjust the band limits, and modify different spectral components, all in a single device. The filter can also be easily extended into two- or three-dimensional applications.

FIG. 2 illustrates a practical example of the utilization of the digital filter operation of the present invention as shown in FIG. 1. The input train of digital signals, comprising 201 received digital signals, is shown by the dotted line (the digital points), such signal being distorted by adding randomly generated noise to the desired output signal. The desired output signal is shown by the solid line, as indicated, with the output of the present invention being shown by the dashed line utilizing the software processing technique as set forth in the flow chart of FIG. 1. As will be apparent, the filtered output utilizing the present invention very closely resembles the desired output. This can be compared with various prior art techniques as, for example, where the widely used Hanning window is applied, which results in an output, as shown by the dash-dot line, closely tracking the desired output only in the central portion thereof but diverging therefrom at the edges due to the aforediscussed problems inherent in using a window function to alter the waveform of the original signals. Other windowing techniques will give results generally similar to that of the Hanning window.

While only digital filters have been specifically discussed as a means of utilizing the technique of the present invention in Fourier transform operations, other applications are quite possible. For example, in measuring the attenuation coefficient or quality factor Q from seismic, acoustic, or other signals, it is conventional to use the spectral ratios of the signals measured at two different distances in the same medium. As with the digital filters, in obtaining the spectra for the attenuation or Q measurement, the original digital signals are transformed into the frequency domain through the DFT (or FFT), and are thus plagued by the aforementioned Gibbs phenomenon. Using the techniques of the present invention to make the first and last points of the signal train to become equal or near equal without otherwise altering the original signals, a highly accurate representation of the spectral ratios of the original signals can be achieved in the manner set forth hereinbefore so as to eliminate the ringing effect or spectral leakage created by the Gibbs phenomenon. An example of a system using such spectral ratio measurements is shown in my aforementioned prior U.S. Pat. No. 5,574,674.

Although the best modes contemplated for carrying out the present invention have been herein shown and described, it will be apparent that modifications and variations may be made without departing from what is regarded to be the subject matter of the invention.

What is claimed is:

1. Digital processing apparatus for providing a frequency spectrum of a digital waveform by computing the Fourier transform of a train of sampled digital signals at uniform time intervals without introducing the Gibbs phenomenon, said apparatus comprising means for receiving a train of such signals over a period of time with said train of signals being represented by a sequence of discrete numerical values beginning with a first value at the start of the time period and ending with an end value at the end of the time period, means for insuring that the first value and the end value are the same within a predetermined tolerance limit, and means for transforming the sequence into a plurality of frequency domain component digital signals by using a digital Fourier transform method whereby an accurate frequency domain transformation of the sequence Is accomplished without introducing errors due to the discontinuities at the beginning and end of the sequence to thereby eliminate the Gibbs phenomenon.

2. Digital processing apparatus according to claim 1 wherein said means for insuring that the first value and the end value are the same comprises means for monitoring the numerical values after the first value and for terminating the sequence when the end value is within the predetermined tolerance limit of the first value.

3. Digital processing apparatus according to claim 2 wherein said monitoring means is initiated only after a predetermined number of discrete numerical values have been received by the apparatus in order to insure a full periodicity of the train of digital signals.

4. A digital filter comprising means for receiving a train of digital signals at uniform time intervals over a period of time with said train of signals being represented in the form of a sequence of discrete numerical values beginning with a first value at the start of the time period and ending with an end value at the end of the time periods means for insuring that the first value and the end value are the same within a predetermined tolerance limit, means for transforming said train of signals into a plurality of frequency component values by using a digital Fourier transform method whereby an accurate frequency domain transformation is accomplished without introducing errors from the Gibbs phenomenon due to discontinuities at the beginning and end of the sequences means for eliminating certain frequency domain component values and retaining only those frequency domain component values of predetermined interests and means for performing an inverse Fourier transform on the retained frequency domain component values to provide a filtered sequence of signals comprised of a train of digital signals at said uniform intervals.

5. A digital filter according to claim 4 wherein said means for insuring that the first value and the end value are the same comprises means for monitoring the numerical values after the first value and for terminating the sequence when the end value is within the predetermined tolerance limit of the first value.

6. A digital filter according to claim 5 wherein said monitoring means is initiated only after a predetermined number of discrete numerical values have been received by the apparatus in order to insure a full periodicity of the train of digital signals.

7. A spectral resolution process for eliminating the Gibbs phenomenon in a train of sampled digital signals at uniform time intervals which includes the steps of starting the reception of the train of signals at an arbitrary time and stopping the reception of the signals at some later time to thereby receive the signals over a period of time with said train of signals being represented by a digital waveform and defining a sequence of discrete numerical values beginning with a first value at the start of the time period and ending with an end value at the end of the time period, the improvement comprising the steps of insuring that the end value is the same as the first value within a predetermined tolerance limit, and transforming the sequence into a plurality of frequency domain component digital signals by using a digital Fourier transform method whereby an accurate frequency domain transformation of the sequence is accomplished without introducing errors due to the discontinuities at the start and end of the sequence to thereby eliminate the effects of the Gibbs phenomenon in the transformation process.

8. A process according to claim 7 further including the steps of selectively eliminating certain of the frequency domain component digital signals from the transformed sequence values and retaining only those frequency domain component digital signals of predetermined interest, performing an inverse Fourier transform on the retained frequency domain component digital signals, and outputting a second train of digital signals at said uniform time intervals undistorted by the Gibbs phenomenon.

9. A process according to claim 8 wherein said step of insuring comprises monitoring the numerical values after the first value and terminating the sequence when the end value is within the predetermined tolerance limit of the first value.

10. A process according to claim 9 wherein said monitoring step is not initiated until after a predetermined time period has elapsed in order to insure a full periodicity of the train of digital signals.

11. A process according to claim 7 wherein said step of insuring comprises monitoring the numerical values after the first value and terminating the sequence when end value is within the predetermined tolerance limit of the first value.

12. A process according to claim 11 wherein said monitoring step is not initiated until after a predetermined time period has elapsed in order to insure a full periodicity of the train of digital signals.

* * * * *